United States Patent
Kuo et al.

(10) Patent No.: US 7,453,943 B2
(45) Date of Patent: Nov. 18, 2008

(54) HYBRID CIRCUIT FOR BROADBAND MODEMS

(75) Inventors: Augustine Kuo, Berkeley, CA (US);
Tom Kwan, Cupertino, CA (US);
Sumant Ranganathan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 586 days.

(21) Appl. No.: 10/692,821

(22) Filed: Oct. 27, 2003

(65) Prior Publication Data
US 2005/0089158 A1 Apr. 28, 2005

(51) Int. Cl.
*H04B 3/00* (2006.01)
*H04B 1/38* (2006.01)
*H04M 1/00* (2006.01)
*H04M 9/00* (2006.01)

(52) U.S. Cl. .................. 375/257; 375/258; 375/222; 379/413.02; 379/399.01

(58) Field of Classification Search .............. 375/219, 375/222, 257, 258; 331/117, 120; 379/392, 379/393, 399.01, 402, 403
See application file for complete search history.

(56) References Cited

U.S. PATENT DOCUMENTS

| 5,680,397 | A | * | 10/1997 | Christensen et al. ........ 370/421 |
| 6,163,579 | A | * | 12/2000 | Harrington et al. .......... 375/257 |
| 6,278,695 | B1 | * | 8/2001 | Christensen et al. ........ 370/254 |
| 6,870,928 | B1 | * | 3/2005 | Conroy et al. .......... 379/399.01 |
| 6,925,172 | B2 | * | 8/2005 | Sabouri et al. ......... 379/399.01 |
| 7,054,279 | B2 | * | 5/2006 | Robinson et al. ............ 370/285 |
| 2006/0062378 | A1 | * | 3/2006 | Choksi ................. 379/399.01 |

* cited by examiner

*Primary Examiner*—Mohammad Ghayour
*Assistant Examiner*—Lawrence B Williams
(74) *Attorney, Agent, or Firm*—Sterne Kessler Goldstein & Fox, p.l.l.c.

(57) ABSTRACT

A hybrid circuit that decouples gains for a transmit signal and a receive signal of a broadband modem that is coupled to a telephone line is provided. The hybrid circuit includes a multi-port transformer, a pair of line matching resistors, and a bridge circuit. The multi-port transformer includes a line coil electrically coupled to a telephone line, a linedriver coil magnetically coupled to the line coil and a receive coil that is also magnetically coupled to the line coil. In an alternate embodiment, a hybrid circuit is provided that includes a multi-port transformer in which the line coil, linedriver coil and receive coil include two coil segments. A broadband modem incorporating a hybrid circuit of the present invention is also provided.

14 Claims, 5 Drawing Sheets

HYBRID CIRCUIT FOR BROADBAND MODEMS

BACKGROUND OF THE INVENTION

1. Field of the Invention

The present invention relates to broadband communications, and in particular to a hybrid circuit which couples a broadband modem to a plain-old-telephone service (POTS) line.

2. Related Art

The evolution of the public switched telephone network from an analog to a digital network, and the introduction of the Internet have stimulated the growth of high bandwidth services. These services include such things as interactive gaming, interactive websites incorporating video and audio, video conferencing, online videos, and downloading of large files. Increasingly, however, consumers are demanding higher quality and faster broadband services.

Service providers deliver these high bandwidth services to consumers using a variety of delivery technologies, such as cable modems and digital subscriber line (DSL) modems. A plethora of DSL technologies exist, such as symmetric subscriber line (SDSL), asymmetric DSL (ADSL) and very high rate DSL (VDSL). Common to each DSL approach is that the broadband modems use the existing telephone infrastructure, including the so called "last mile" of the network, which is the leg from a central office to a customer premise (e.g., home or office).

ADSL, for example, is a high speed duplex broadband transmission technique used to establish a broadband connection over ordinary telephone lines using two broadband modems placed between a customer premise and a central office. The broadband modem at the central office is, in turn, connected to routers that are connected to the Internet or other packet switched network. For all DSL applications an approach must be used to couple receive and transmit modem signals from the telephone line to the broadband modem, and to separate the receive and transmit modem signals. A hybrid circuit is often the approach used. Typically, a transformer in the hybrid circuit provides gain for the transmit modem signal, and attenuates the receive modem signal by the same magnitude as the gain provided for the transmit modem signal.

The evolution of integrated circuit technology and the need to decouple modem transmit and receive signals presents a challenge. In particular, industry technical specifications for ADSL specify a peak transmit voltage that is high, fixed at sixteen volts peak-to-peak, whereas the supply voltages for advanced integrated circuits keep decreasing. Simply increasing the turns ratio of a transformer within a hybrid circuit to achieve the high voltage needed for the modem transmit signal will cause more attenuation of the modem receive signal. This approach will severely limit performance because the signal level of the modem receive signal would be significantly lowered and, as a result, more errors would occur in attempting to process the modem receive signal. Current approaches to this problem are to have either a separate high voltage capable linedriver integrated circuit within a broadband modem or to have a specialized process that combines a high voltage capable linedriver circuit with a broadband modem. These approaches, however, introduce additional costs and complexity into broadband transmission hardware.

What is needed is a hybrid circuit that can effectively decouple modem transmit and receive signals without introducing unnecessary costs or other performance impairments.

SUMMARY OF THE INVENTION

The present invention provides a hybrid circuit that decouples gains for a transmit signal and a receive signal of a broadband modem that is coupled to a telephone line. The hybrid circuit includes a multi-port transformer, a pair of line matching resistors, and a bridge circuit. The multi-port transformer includes a line coil electrically coupled to a telephone line, a linedriver coil and a receive coil, all of which are magnetically coupled to each other.

In an alternate embodiment, a hybrid circuit is provided that includes a multi-port transformer in which the line coil, linedriver coil and receive coil include two coil segments. In the case of the line and linedriver coil, these coil segments are separated by a capacitor. In the case of the receive coil, a node between the two coil segments is coupled to ground.

A broadband modem incorporating a hybrid circuit of the present invention is also provided.

The present invention provides the advantage that the transmit and receive modem signals can be decoupled. Thus, large gains can be provided for the transmit modem signal without significant attenuation to the receive modem signals. As a result, a broadband modem incorporating the present invention can achieve higher performance. Additionally, an alternate embodiment provides the additional advantage that any spurious narrowband voice signals can be isolated from the broadband signals.

Further embodiments, features, and advantages of the present invention, as well as the structure and operation of the various embodiments of the present invention are described in detail below with reference to accompanying drawings.

BRIEF DESCRIPTION OF THE FIGURES

The present invention is described with reference to the accompanying drawings. In the drawings, like reference numbers indicate identical or functionally similar elements.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Figure 1:
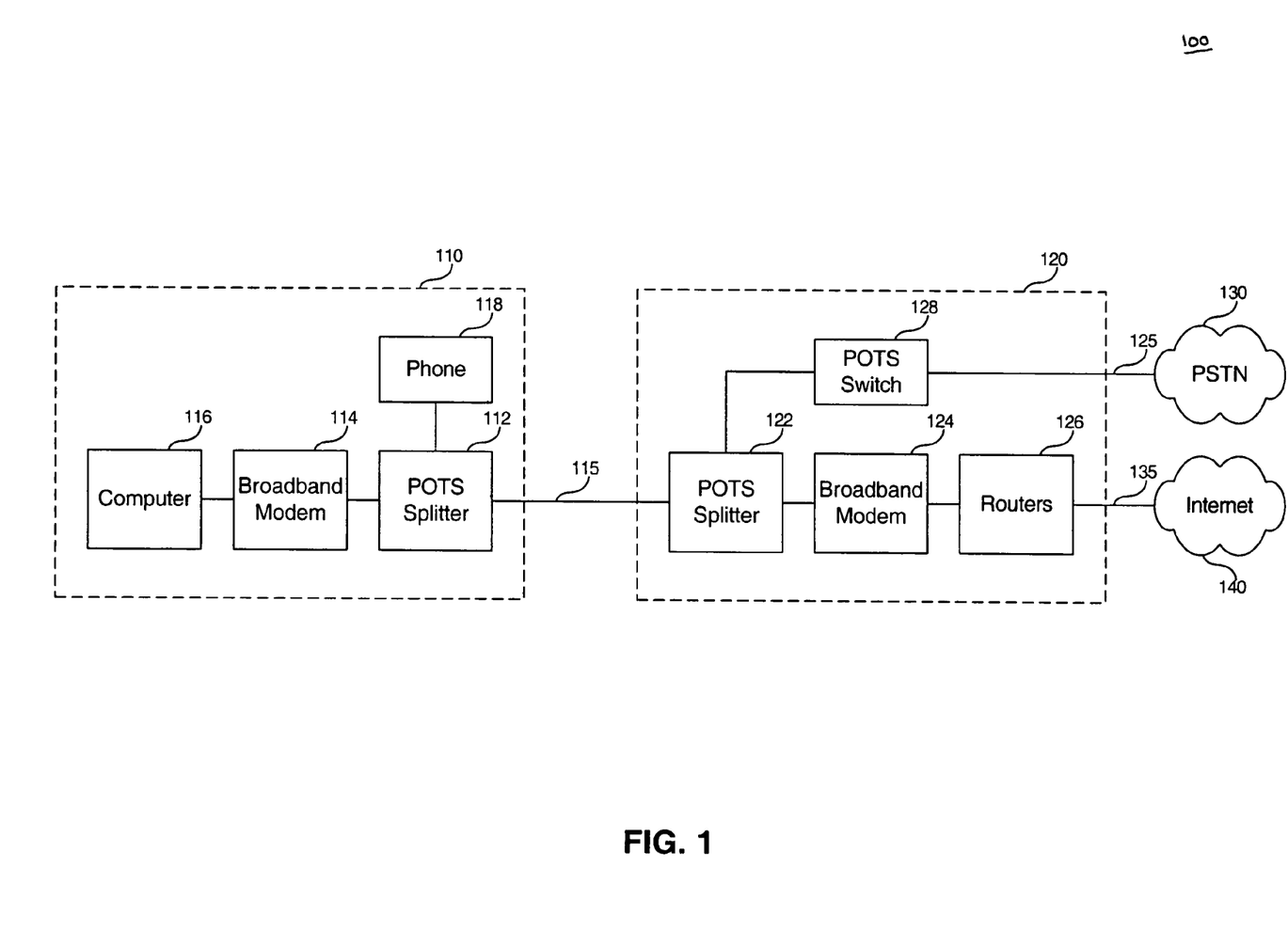
FIG. 1 is a diagram of a broadband communications system.

FIG. 1 illustrates broadband communications system 100 which provides an example of a portion of a much larger broadband communication system. Broadband communication system 100 includes customer premise 110, central office 120, public switch telephone network (PSTN) 130, and Internet 140. Communications path 115 couples customer premise 110 to central office 120. Communications path 125 couples central office 120 to PSTN 130, and communications path 135 couples central office 120 to Internet 140. Communications paths 115, 125, and 135 can be either wireline or wireless.

Customer premise 110 includes a POTS (plain old telephone service) splitter 112, a broadband modem 114, a computer 116 and a telephone 118. POTS splitter 112 is coupled to communication path 115. POTS splitter 112 is used to couple narrowband telephone signals between telephone 118 and communications path 115, and to couple broadband communications signals between broadband modem 114 and communications path 115. Computer 116 is coupled to broadband modem 114.

Central office 120 includes POTS splitter 122, broadband modem 124, router 126, and POTS switch 128. POTS splitter 122 is coupled to communications path 115. POTS splitter 122 is used to couple narrowband telephone signals between POTS switch 128 and communications path 115, and to couple broadband communications signals between broadband modem 124 and communications path 115. Router 126 is coupled to broadband modem 124 and to Internet 140 through communications path 135. Similarly, POTS switch 128 is coupled to PSTN 130 through communications path 125.

Narrowband telephone signals will typically be transmitted in the frequency bandwidth between zero and four kilohertz and have low data rates, while broadband signals will be transmitted in the frequency bandwidth approximately between four kilohertz and up to about one megahertz and have high data rates.

Broadband modems 114 and 124 can support one or more duplex transmission standards including, but not limited to symmetric digital subscriber line (SDSL), asymmetric DSL (ADSL) and very high rate DSL (VDSL). SDSL typically has an upstream (from customer premise to central office) transmission speed of about 1.5 Mbps, and a downstream (from central office to customer premise) transmission speed of about 1.5 Mbps. ADSL has an upstream transmission rate between 16 and 800 Kbps and a downstream transmission rate between 512 Kbps and 8 Mbps. VDSL has an upstream transmission rate between 1.6 and 2.3 Mbps and a downstream transmission rate between 13 and 55 Mbps. In each case, the exact rate will be a function of a variety of factors, but is most influenced by the distance of the communication path, such as communications path 115, between a central office, such as central office 120, and a customer premise, such as customer premise 110.

When a customer seeks to transmit a broadband signal, computer 116 transmits a signal to broadband modem 114. Broadband modem 114 will generate a modem transmit signal. Broadband modem 114 transmits the modem transmit signal to POTS splitter 112. Modem transmit signal is coupled to communications path 115 by POTS splitter 112. Communications path 115 carries the modem transmit signal to central office 120, where POTS splitter 122 couples the modem transmit signal to broadband modem 124. Broadband modem 124 receives the modem transmit signal, processes the modem transmit signal and transmits information in the signal to router 126. Router 126 then routes the information contained in the modem transmit signal to Internet 140.

When a customer receives a broadband signal from central office 120, POTS splitter 112 couples the received broadband signal to broadband modem 114. The received broadband signal can now be referred to as a modem receive signal. Broadband modem 114 processes the modem receive signal and transmits the information contained in the modem receive signal to computer 116 for use by an end user.

Figure 2:
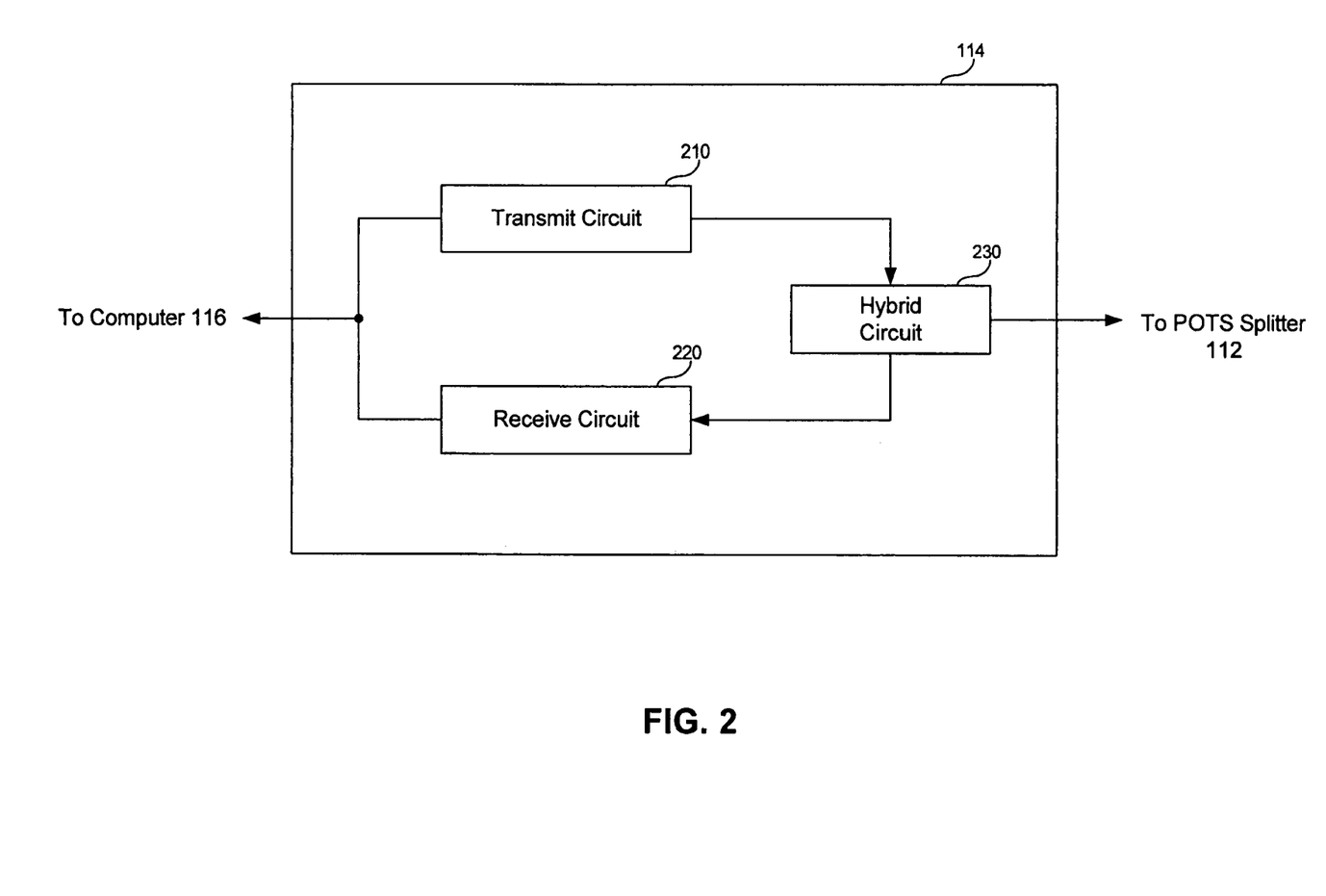
FIG. 2 is a diagram of a broadband modem.

FIG. 2 provides a high level example of the components within broadband modem 114 for processing modem transmit signals and modem receive signals. Broadband modem 114 includes transmit circuit 210, receive circuit 220 and hybrid circuit 230. Transmit circuit 210 generates a modem transmit signal based on information received from computer 116, and transmits the transmit modem signal to hybrid circuit 230. Receive circuit 220 receives a receive modem signal from hybrid circuit 230 and transmits information to computer 116 based on the information contained in the receive modem signal. In addition to being coupled to both transmit circuit 210 and receive circuit 220, hybrid circuit 230 is coupled to POTS splitter 112. In an alternate embodiment, hybrid circuit 230 can be external to broadband modem 114.

Figure 3:
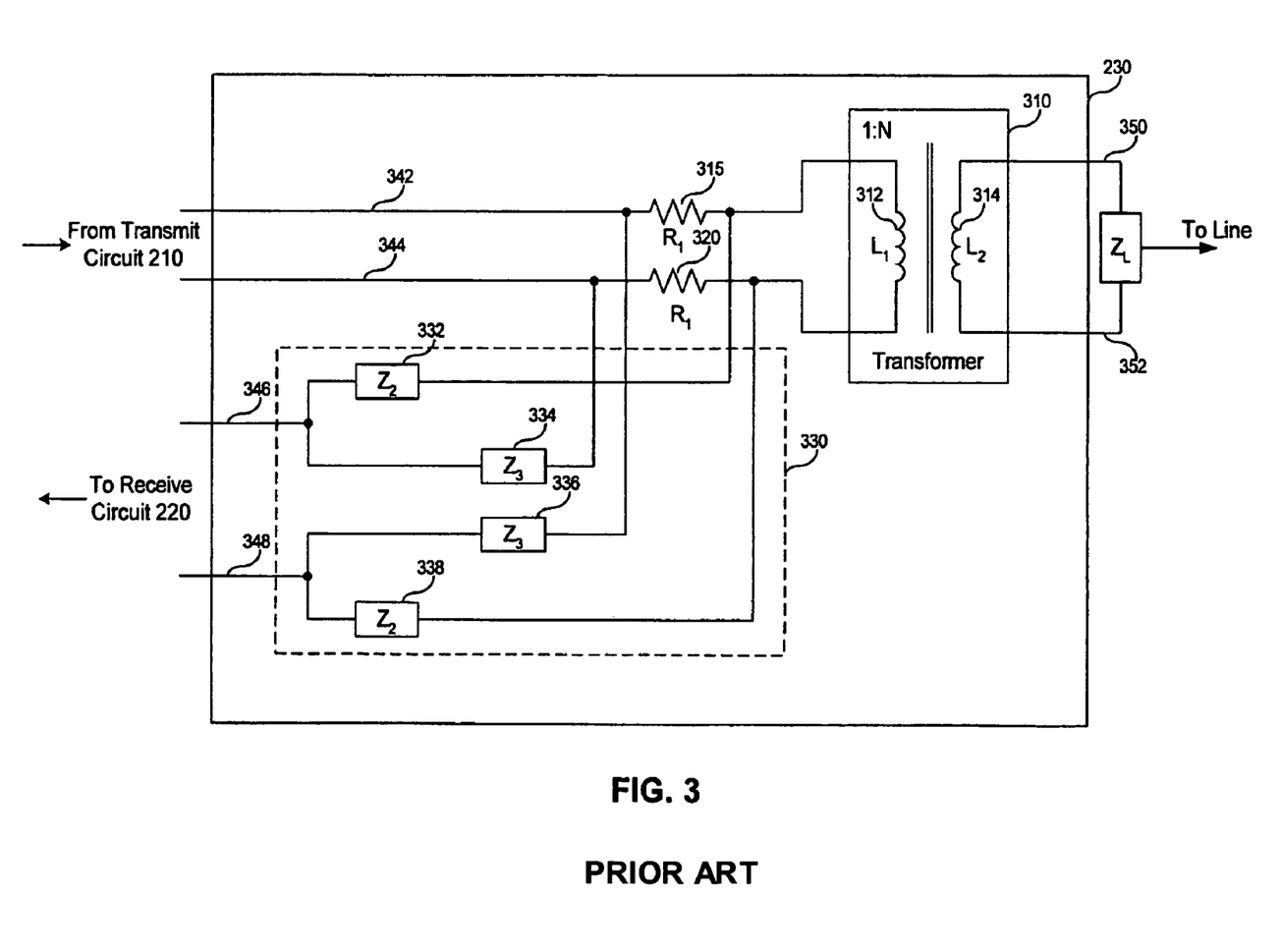
FIG. 3 is a diagram of a hybrid circuit within a broadband modem.

FIG. 3 provides an example hybrid circuit 230. Hybrid circuit 230 is used to couple receive and transmit modem signals from a telephone line, and to separate the receive and transmit modem signals. Hybrid circuit 230 includes transformer 310, a pair of line matching resistors 315 and 320, and a bridge circuit 330.

Transformer 310 includes transmit/receive coil 312 and line coil 314. The turns ratio of transmit/receive coil 312 to line coil 314 is 1:N, where N is typically 1 or 2. Line matching resistors 315 and 320 each have a resistance, $R_1$, and are used to match the impedance associated with the incoming telephone line. Finally, bridge circuit 330 is used to subtract off the transmit modem signal from the receive modem signal by summing a 180 degree phase shifted version of the transmit modem signal with the receive modem signal.

One end of line coil 314 is coupled to communications path 350 and the other end of line coil 314 is coupled to communications path 352. Collectively, communications paths 350 and 352 represent a two-wire twisted pair telephone line. Communications path 350 is often referred to as tip, while communications path 352 is referred to as ring. The telephone line induces an impedance $Z_1$ across line coil 314.

One end of transmit/receive coil 312 is coupled to one end of line matching resistor 315 and the other end of transmit/receive coil 312 is coupled to one end of line matching resistor 320. The other end of line matching resistor 315 is connected to communications path 342, which is one wire of a two wire communications path from transmit circuit 210. Similarly, the other end of line matching resistor 320 is connected to communications path 344, which is one wire of a two wire communications path from transmit circuit 210.

Bridge circuit 330 consists of circuit components to create a bridge circuit with four legs having impedances 332, 334, 336 and 338, respectively. Impedances 332 and 338 have the same impedance, $Z_2$. Impedances 334 and 336 have the same impedance, $Z_3$. Bridge circuit 330 has two connections on one side of line matching resistors 315 and 320 and two connections on the opposite side of line matching resistors 315 and 320. Specifically, impedance 332 is coupled between communications path 346 and a node that is between line matching resistor 315 and receive/transmit coil 312. Impedance 334 is coupled between communications path 346 and a node that is between line matching resistor 320 and transmit circuit 210. Impedance 336 is coupled between communications path 348 and a node that is between line matching resistor 315 and transmit circuit 210. Impedance 338 is coupled between communications path 348 and a node that is between line matching resistor 320 and receive/transmit coil 312. Based on the teachings herein, circuit components to implement impedances 332, 334, 336, and 338 will be known by individuals skilled in the relevant arts. Communications paths 346 and 348 represent a two-wire interface to receive circuit 220. Communications paths 342 and 344 represent a two-wire interface to transmit circuit 210.

The operation of hybrid circuit 230, depicted in FIG. 3, is as follows. When a receive modem signal is received on communications paths 350 and 352, transformer 310 couples and attenuates the signal. The receive modem signal attenuation is based on the turns ratio between receive/transmit coil 312 and line coil 314. The receive modem signal is then processed through bridge circuit 330 and carried along communications paths 346 and 348 to receive circuit 220.

When a signal is to be transmitted, hybrid circuit 230 receives a transmit modem signal on communications paths 342 and 344. The transmit modem signal is coupled to communications paths 350 and 352 (the telephone line) through transformer 310. The transmit modem signal gain is based on the turns ratio between receive/transmit coil 312 and line coil 314.

As was discussed above, a problem with the hybrid circuit depicted in FIG. 3 is that when the turns ratio between the transmit/receive coil and line coil is adjusted to increase the gain of a transmit modem signal, the attenuation of a receive modem signal will also be increased. Increasing the attenuation will likely produce undesirable effects, and degrade performance.

Figure 4:
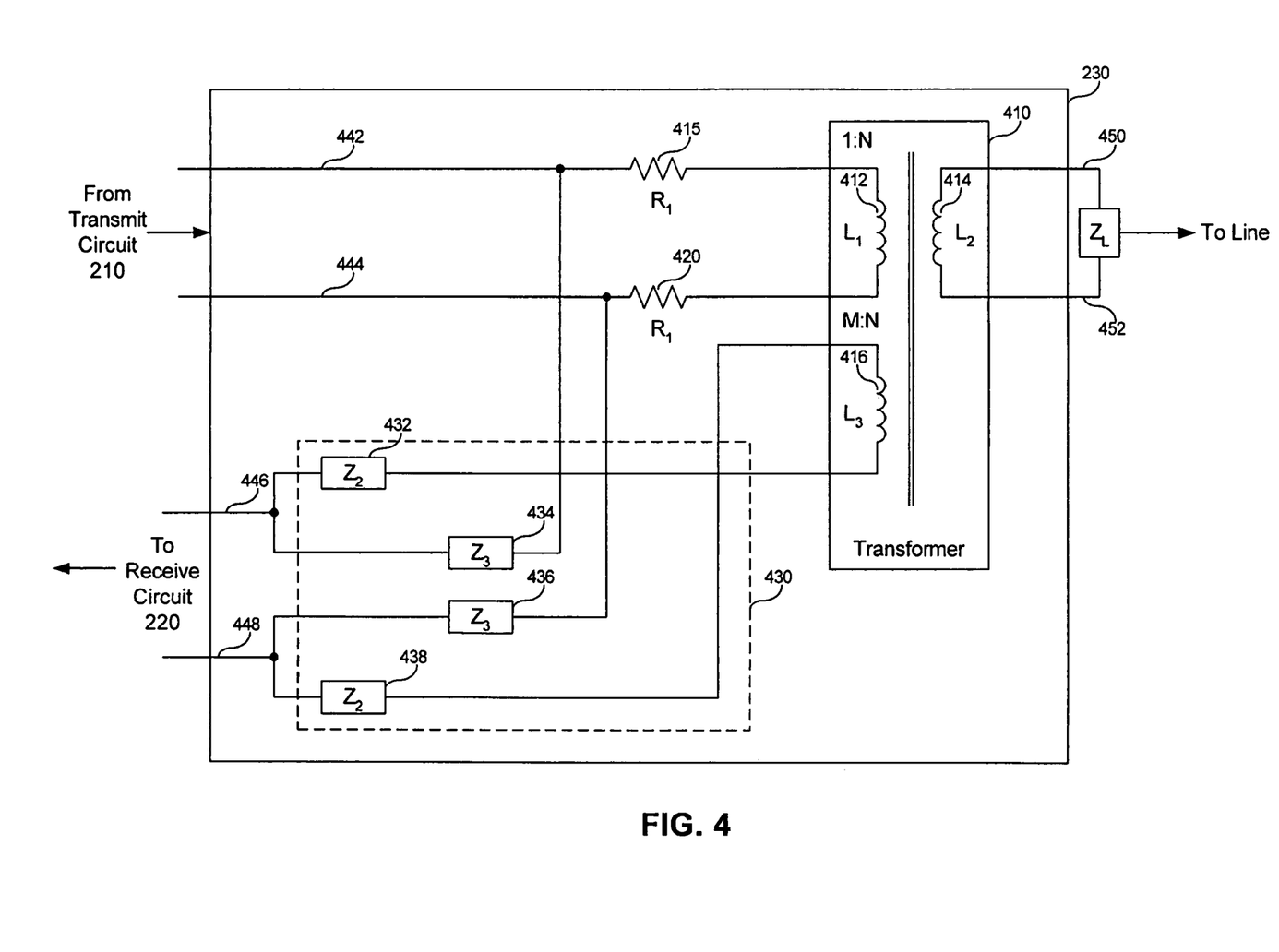
FIG. 4 is a diagram of a hybrid circuit that decouples gains from modem receive and transmit signals, according to an embodiment of the present invention.

FIG. 4 provides a hybrid circuit 230 that decouples gains from modem receive and transmit signals, according to an embodiment of the present invention. Hybrid circuit 230 depicted in FIG. 4 addresses the shortcomings of the hybrid circuit depicted in FIG. 3, and decouples the modem receive and transmit signals throughout the hybrid circuit. Hybrid circuit 230 includes multi-port transformer 410, a pair of line matching resistors 415 and 420, and bridge circuit 430.

Multi-port transformer 410 includes linedriver coil 412, line coil 414 and receive coil 416. Line coil 414 is electrically coupled to a telephone line, represented by communications paths 450 and 452. Linedriver coil 412 is magnetically coupled to line coil 414 and receive coil 416, and electrically coupled to a broadband modem transmit path, represented by communications paths 442 and 444, that carries a modem transmit signal from transmit circuit 210. Receive coil 416 is magnetically coupled to linedriver coil 412 and line coil 414, and electrically coupled through bridge circuit 430 to receive circuit 220 that receives a receive modem signal.

The turns ratio of linedriver coil 412 to line coil 414 is 1:N. The turns ratio of receive coil 416 to line coil 414 is M:N. In one embodiment, M=N=4.25. M and N can be varied depending on the relative attenuation and gain desired for the modem receive and transmit signals.

Line matching resistors 415 and 420 each have a resistance, $R_1$, and are used to match the impedance associated with the incoming telephone line. In one embodiment, each of line matching resistors 415 and 420 has a resistance of about 2.75 ohms. Finally, bridge circuit 430 is used to subtract off the transmit modem signal from the receive modem signal by summing a 180 degree phase shifted version of the transmit modem signal with the receive modem signal.

The coils of multi-port transformer 410 are electrically coupled as follows. One end of line coil 414 is coupled to communications path 450 and the other end of line coil 414 is connected to communications path 452. As indicated previously, collectively, communications paths 450 and 452 represent a two-wire twisted pair telephone line. Communications path 450 is often referred to as tip, while communications path 452 is referred to as ring. The telephone line induces an impedance $Z_1$ across line coil 414.

One end of linedriver coil 412 is coupled to one end of line matching resistor 415 and the other end of linedriver coil 412 is coupled to one end of line matching resistor 420. The other end of line matching resistor 415 is connected to communications path 442, which is one wire of a two-wire communications path from transmit circuit 210. Similarly, the other end of line matching resistor 420 is connected to communications path 444, which is one wire of a two-wire communications path from transmit circuit 210.

Receive coil 416 is coupled to receive circuit 220 through bridge circuit 430. Bridge circuit 430 consists of circuit components to create a bridge circuit with four legs having impedances 432, 434, 436 and 438, respectively. Impedances 432 and 438 have the same impedance, $Z_2$. Impedances 434 and 436 have the same impedance, $Z_3$. Bridge circuit 430 has two connections on one side of line matching resistors 415 and 420 and two connections to receive coil 416. Specifically, impedance 432 is coupled between one end of receive coil 416 and communications path 446 to receive circuit 220. Impedance 434 is coupled to a node between communications path 446 and a node that is between line matching resistor 415 and transmit circuit 210. Impedance 436 is coupled between communications path 448 and a node that is between line matching resistor 420 and transit circuit 210. Impedance 438 is coupled between the end of receive coil 416 that is not coupled to impedance 432 and communications path 448. Based on the teachings herein, circuit components to implement impedances 432, 434, 436, and 438 will be known by individuals skilled in the relevant arts. In one embodiment for an ADSL system, the inductance for linedriver coil 412 is 22.1 µH, for line coil 414 the inductance is 400 µH, and the inductance for receive coil 416 is also 400 µH.

The operation of hybrid circuit 230, depicted in FIG. 4, is as follows. When a signal is to be transmitted, hybrid circuit 230 receives a transmit modem signal on communications paths 442 and 444. The transmit modem signal is coupled to communications paths 450 and 452 (the telephone line) by transformer 410 through the magnetic coupling of linedriver coil 412 with line coil 414. Since receive coil 416 is also magnetically coupled to linedriver coil 412, communication paths along impedances 432 and 438 will also have the same transmit modem signal. When a receive modem signal is received on communications paths 450 and 452, transformer 410 couples and attenuates the signal through the magnetic coupling of receive coil 416 and line coil 414. Communication paths along impedances 432 and 438 now have both the receive and transmit modem signals. Bridge circuit 430 subtracts off the transmit modem signal, so that only the receive modem signal appears at communication paths 446 and 448 to receive circuit 220.

Figure 5:
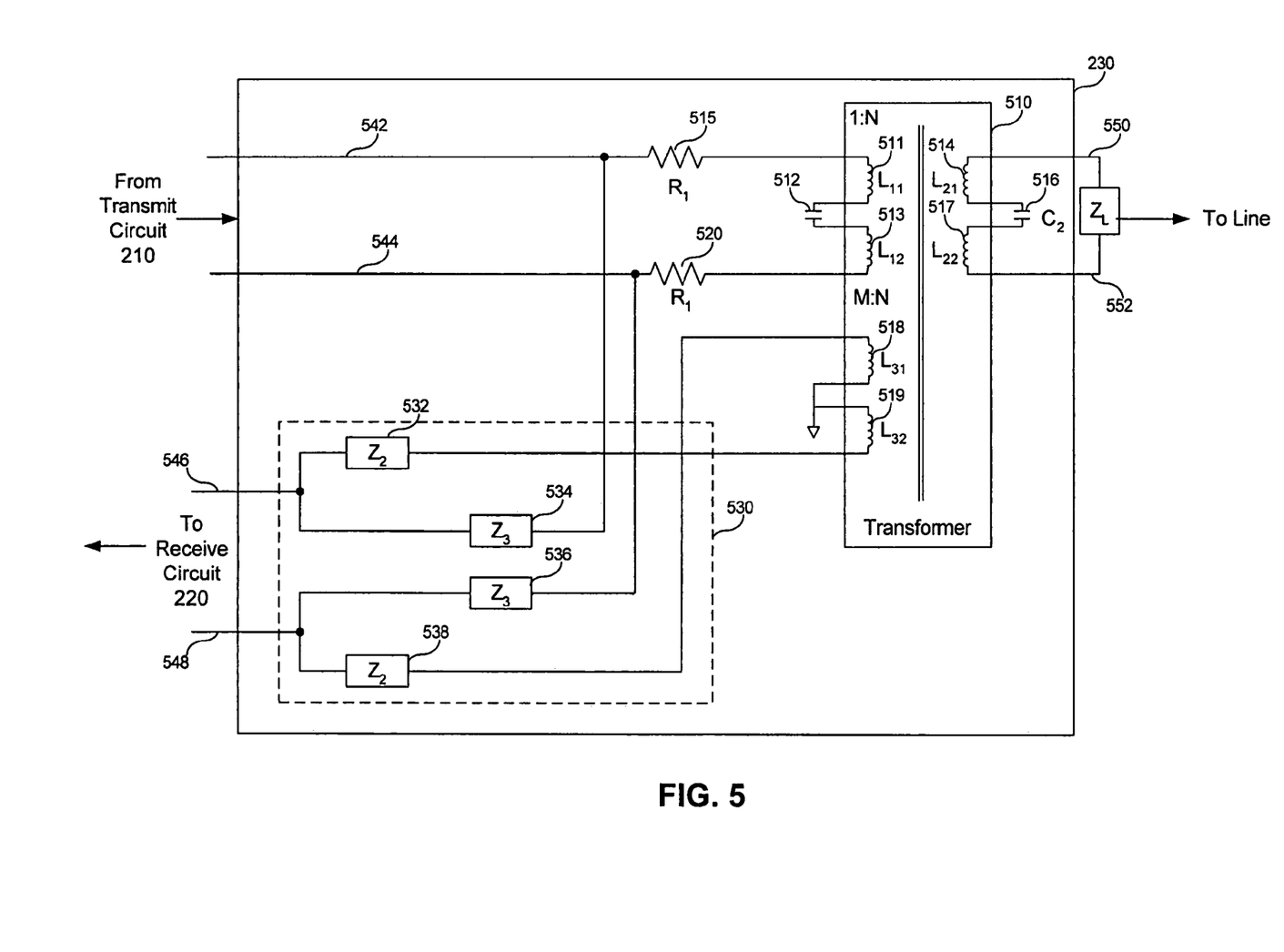
FIG. 5 is a diagram of a hybrid circuit that decouples gains from modem receive and transmit signals and isolates telephone voice signals, according to an embodiment of the present invention.

Another challenge associated with hybrid circuits used with broadband modems relates to the need to isolate narrowband voice signals carried on a telephone line from broadband signals carried on the same telephone line. The hybrid circuit depicted in FIG. 5 addresses this challenge. Specifically, FIG. 5 provides a hybrid circuit 230 that decouples gains from modem receive and transmit signals and isolates telephone voice signals, according to an embodiment of the present invention. In this embodiment, hybrid circuit 230 includes multi-port transformer 510, a pair of line matching resistors 515 and 520, and bridge circuit 530.

Multi-port transformer 510 includes a linedriver coil having three components—first linedriver coil 511, capacitor 512, and second linedriver coil 513—coupled in series. Multi-port transformer 510 also includes a line coil having three components—first line coil 514, capacitor 516, and second line coil 517—coupled in series. Multi-port transformer 510 also includes a receive coil having two components—first receive coil 518 and second receive coil 519—coupled is series with the connection between first receive coil 518 and second receive coil 519 coupled to ground. All coils 514, 517, 511, 513, 518 and 519 are magnetically coupled to each other.

The combination of first line coil 514, capacitor 516 and second line coil 517 is electrically coupled to a telephone line, represented by communications paths 550 and 552. The combination of first linedriver coil 511, capacitor 512 and second linedriver coil 513 is electrically coupled to a broadband modem transmit line, represented by communications paths 542 and 544, that carries a modem transmit signal from transmit circuit 210. The combination of first receive coil 518 and second receive coil 519 is electrically coupled through bridge circuit 530 to receive circuit 220 that receives a receive modem signal.

The turns ratio of first linedriver coil 511 and second linedriver coil 513 to first line coil 514 and second line coil 517 is 1:N. The turns ratio of first receive coil 518 and second receive coil 519 to first line coil 514 and second line coil 517 is M:N. In one embodiment, M=N=4.25. M and N can be varied depending on the relative attenuation and gain desired for the modem receive and transmit signals.

Line matching resistors 515 and 520 each have a resistance, $R_1$, and are used to match the impedance associated with the incoming telephone line. In one embodiment, each of line matching resistors 515 and 520 has a resistance of about 2.75 ohms. Finally, bridge circuit 530 is used to subtract off a transmit modem signal from the receive modem signal by summing a 180 degree phase shifted version of the transmit modem signal with the receive modem signal.

The coils of multi-port transformer 510 are electrically coupled as follows. One end of first line coil 514 is coupled to communications path 550 and one end of first line coil 517 is connected to communications path 552. As indicated previously, collectively, communications paths 550 and 552 represent a two-wire twisted pair telephone line. The telephone line induces an impedance $Z_1$ across first line coil 414 and second line coil 417.

One end of first linedriver coil 511 is coupled to one end of line matching resistor 515 and one end of second linedriver coil 513 is coupled to one end of line matching resistor 520. The other end of line matching resistor 515 is connected to communications path 542, which is one wire of a two-wire communications path from transmit circuit 210. Similarly, the other end of line matching resistor 520 is connected to communications path 544, which is one wire of a two-wire communications path from transmit circuit 210.

First receive coil 518 and second receive coil 519 are coupled to receive circuit 220 through bridge circuit 530. Bridge circuit 530 consists of circuit components to create a bridge circuit with four legs having impedances 532, 534, 536 and 538, respectively. Impedances 532 and 538 have the same impedance, $Z_2$. Impedances 534 and 536 have the same impedance, $Z_3$. Impedance 532 is coupled between one end of first receive coil 519 and communications path 546. Impedance 534 is coupled between communications path 548 and a node that is between line matching resistor 515 and transmit circuit 210. Impedance 536 is coupled between communications path 548 and a node that is between line matching resistor 520 and transmit circuit 210. Impedance 538 is coupled between to the end of second receive coil 519 that is not coupled to ground and communications path 548. Because of the high pass nature of the signals on communications paths 546 and 548, impedances 534 and 536 will have a capacitive element to block any low frequency transmit signals. Based on the teachings herein, circuit components to implement impedances 532, 534, 536, and 538 will be known by individuals skilled in the relevant arts.

In one embodiment for an ADSL system, the inductance for each of linedriver coil 511 and 512 is 5.5 µH, while for each of the other coils the inductance is 100 µH. Capacitor 512 has a capacitance of 470 nF and capacitor 516 has a capacitance of 27 nF.

The operation of hybrid circuit 230, depicted in FIG. 5, is as follows. When a signal is to be transmitted, hybrid circuit 230 receives a transmit modem signal on communications paths 542 and 544. The transmit modem signal is coupled to communications paths 550 and 552 (the telephone line) using transformer 510 through the magnetic coupling of first and second linedriver coils 511, 513 with first and second line coils 514 and 517. Since first receive coil 518 and second receive coil 519 are also magnetically coupled to first line coil 511 and second line coil 513, communication paths along impedances 532 and 538 will also have the same transmit modem signal. When a receive modem signal is received on communication paths 550 and 552, transformer 510 couples and attenuates the signal through the magnetic coupling of receive coils 518 and 519, and line coils 514 and 517. Communication paths along impedances 532 and 538 now have both the receive and transmit signal. Bridge circuit 530 subtracts off the transmit signal so that only the receive modem signal appears at communication paths 546 and 548 to receive circuit 220.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of method steps illustrating the performance of specified functions and relationships thereof. The boundaries of these method steps have been arbitrarily defined herein for the convenience of the description. Alternate boundaries can be defined so long as the specified functions and relationships thereof are appropriately performed. Any such alternate boundaries are thus within the scope and spirit of the claimed invention. Thus, the breadth and scope of the present invention should not be limited by any of the above-described exemplary embodiments, but should be defined only in accordance with the following claims and their equivalents.

What is claimed is:

1. A circuit which decouples gains for a transmit signal and a receive signal of a broadband modem that is coupled to a telephone line, comprising:
   a multi-port transformer including
      i) a line coil electrically coupled to the telephone line;
      ii) a linedriver coil electrically coupled to a broadband modem transmit line carrying the transmit signal of the broadband modem;
      iii) a receive coil electrically coupled to a broadband modem receive line carrying the receive signal of the broadband modem;
      iv) wherein said line coil, said linedriver coil and said receive coil are magnetically coupled to each other;
   a bridge circuit electrically coupled between said multi-port transformer and the broadband modem receive line; and a pair of line matching resistors electrically coupled between said multi-port transformer and the broadband modem transmit line, wherein each of the line matching resistors match the telephone line resistance;

wherein a turns ratio of said linedriver coil to said line coil is 1:N and a turns ratio of said receive coil to said line coil is M:N "; wherein M and N are adaptively varied depending upon the relative attenuation and gain desired for the modem receive and transmit signals."

2. The circuit of claim 1, wherein said bridge circuit is coupled to the broadband modem transmit line and subtracts the transmit signal from the receive signal.

3. The circuit of claim 1, wherein the broadband modem is an ADSL modem.

4. The circuit of claim 1, wherein the broadband modem is a VDSL modem.

5. The circuit of claim 1, wherein the broadband modem is a HDSL modem.

6. A broadband modem for coupling a broadband signal to a telephone line, comprising:

a transmit circuit that provides a modem transmit signal;

a receive circuit that receives a modem receive signal;

a hybrid circuit coupled to said transmit circuit and said receive circuit which decouples gains for the modem transmit signal and the modem receive signal, wherein said hybrid circuit comprises:

a multi-port transformer including i) a line coil electrically coupled to the telephone line;

ii) a linedriver coil electrically coupled to a broadband modem transmit line carrying a transmit signal of said transmit circuit;

iii) a receive coil electrically coupled to said receive circuit carrying a receive signal of the receive circuit;

iv)

wherein within said hybrid circuit a turns ratio of said linedriver coil to said line coil is 1:N and a turns ratio of said receive coil to said line coil is M:N; wherein M and N are adaptively varied depending upon the relative attenuation and gain desired for the modem receive and transmit signals.

7. The broadband modem of claim 6, wherein the broadband signal is an ADSL signal.

8. The broadband modem of claim 6, wherein the broadband signal is a VDSL signal.

9. The broadband modem of claim 6, wherein the broadband signal is a HDSL signal.

10. The circuit of claim 1, wherein said multi-port transformer isolates narrowband voice signals.

11. The circuit of claim 10, wherein
i) said line coil includes a first line coil, a line capacitor and a second line coil,
ii) wherein said linedriver coil includes a first linedriver coil, a linedriver capacitor and a second linedriver coil,
iii) wherein said receive coil includes a first receive coil and a second receive coil, wherein a node between the first receive coil and the second receive coil is coupled to ground.

12. The broadband modem of claim 6, wherein said hybrid circuit further comprises:

a bridge circuit electrically coupled between said multi-port transformer and said receive circuit; and a pair of line matching resistors electrically coupled between said multi-port transformer and said transmit circuit, wherein each of the line matching resistors match the telephone line resistance.

13. The circuit of claim 6, wherein said multi-port transformer isolates narrowband voice signals.

14. The circuit of claim 13, wherein
i) said line coil includes a first line coil, a line capacitor and a second line coil,
ii) wherein said linedriver coil includes a first linedriver coil, a linedriver capacitor and a second linedriver coil,
iv) wherein said receive coil includes a first receive coil and a second receive coil, wherein a node between the first receive coil and the second receive coil is coupled to ground.

* * * * *